United States Patent
Bortz et al.

[19]

[11] Patent Number: 6,109,629
[45] Date of Patent: Aug. 29, 2000

[54] SUBFRAME FOR MOTOR VEHICLES

[75] Inventors: Joachim Bortz, Köngen; Hubert Brühl, Waldstetten; Martin Mayerhofer, Reutlingen; Harald Schwer, Ulm, all of Germany

[73] Assignee: Daimler Benz Aktiengesellschaft, Stuttgart, Germany

[21] Appl. No.: 09/116,350

[22] Filed: Jul. 16, 1998

[30] Foreign Application Priority Data

Jul. 16, 1997 [DE] Germany ............................ 197 30 404

[51] Int. Cl.⁷ ............................................... B62D 7/22
[52] U.S. Cl. .................................... 280/124.109; 280/788
[58] Field of Search ........................... 280/124.109, 781, 280/785, 784, 788

[56] References Cited

U.S. PATENT DOCUMENTS

| | | | |
|---|---|---|---|
| 4,943,081 | 7/1990 | Golpe | 280/666 |
| 4,964,651 | 10/1990 | Kubo | 280/690 |
| 5,280,957 | 1/1994 | Hentschel et al. | 280/788 |
| 5,611,569 | 3/1997 | Sekiguchi et al. | 280/788 |
| 5,641,180 | 6/1997 | Kamei et al. | 280/781 |
| 5,918,893 | 7/1999 | Marquardt et al. | 280/124.109 |

FOREIGN PATENT DOCUMENTS

| | | |
|---|---|---|
| 0 477 654 | 4/1992 | European Pat. Off. . |
| 44 08 573 | 9/1994 | Germany . |
| 2-54681 | 4/1990 | Japan . |
| 4-13473 | 2/1992 | Japan . |
| 5-23366 | 6/1993 | Japan . |

*Primary Examiner*—Paul N. Dickson
*Assistant Examiner*—Tony Winner
*Attorney, Agent, or Firm*—Kenyon & Kenyon

[57] ABSTRACT

A subframe for motor vehicles, in particular for the front axles of passenger cars, which includes side parts running in the longitudinal vehicle direction that are joined by upper and lower cross elements running in the transverse vehicle direction to form a box profiled section, which is deformable in the longitudinal direction in response to longitudinal forces produced by a collision, and which is able to be used as an assembly unit.

16 Claims, 2 Drawing Sheets

SUBFRAME FOR MOTOR VEHICLES

FIELD OF THE INVENTION

The present invention relates to a subframe for motor vehicles, and, in particular, to a subframe for front axles of passenger cars.

RELATED TECHNOLOGY

Subframes for motor vehicles are used for passenger cars, in particular, but also for vehicles similar in design to passenger cars, including off-road vehicles and light trucks. Subframes may be suspension subframes, which are coupled via flexible articulated links, or hinges, to the frame or to the vehicle body. They are also may be so-called integral structural members, where the subframe is rigidly joined to the frame or to the vehicle body, in particular to the vehicle's side member elements, such as front-end members or the like. In both embodiments—as suspension subframes as well as integral structural members—the subframes are, in part, assembly, or mounting, frames, on which the suspension elements, in some instances inclusive of the wheel suspension, are articulated or supported, and/or which are used as supports for the steering system and/or the stabilizer. Sometimes, subframes of this kind are also used as engine supports, so that they must be quite stable in design in view of the forces acting upon them during normal operation.

The subframes are usually constructed from two side parts, which are detachably joined across front and rear, flexible or rigid articulated links to structural members or frame side members, and which are braced against each other across cross elements, the subframe usually forming a single, integrated unit. In practical applications, subframes of this kind are used both in conjunction with front axles as well as with rear axles of passenger vehicles, with conflicting demands being placed on the subframe and on the front-end vehicle design, particularly as far as the front axles are concerned. In front-end design, for safety reasons, a specific deformability is often required of the front-end side member associated with the frame or the vehicle body. Deformation zones thus exist which correspond to partial areas of the frame-side or body-side side member, where the side parts of the subframe are secured to these members. Particularly when working with integral members, i.e., when the subframe is rigidly joined to the corresponding frame or structural members, the side parts of the subframe can constitute additional supporting, or bracing, elements. These supporting elements conflict with the deformation properties desired for the side members of the frame or body, especially as a proper deformation of the subframe is often additionally prevented over the subframe's cross elements in the longitudinal direction of the vehicle.

SUMMARY OF THE INVENTION

The present invention aims to provide a subframe which is satisfactory with respect to collision performance characteristics from the standpoint of safety, and also with respect to the requisite operational strength and rigidity. In addition, the present invention may facilitate favorable assembly conditions.

The present invention provides a subframe for motor vehicles, in particular for front axles of passenger cars, having independent wheel suspension and wheels supported by upper and lower suspensions elements. Upper and lower articulated links formed by bearings on and in the area of side parts of the subframe running in the longitudinal vehicle direction are assigned to the upper and lower suspension elements, the side parts being detachably secured to the body or frame of the vehicle and joined via cross elements. The side parts (2) are able to be shortened in length under the influence of longitudinal forces. With respect to the cross elements (3, 4), at least one is designed as an upper cross member (3), beneath which a lower, platelike, flat cross element (4) is arranged and is joined at the level of bearings (17, 18) of the lower suspension elements to the side parts (2).

The fact that the side parts are uncoupled in their deformation properties—in the event of a collision under the influence of forces acting in the longitudinal direction of the vehicle—from the structural or frame side members that support them, enables, first of all, the subframe structure to be retained in the event of a collision, even when accompanied by a deformation or crumpling of the structural or frame side members, as occurs for safety reasons, because the side parts are likewise designed to be deformable to specific areas. Since, in conventional vehicle designs, the deformation zone of the structural or frame side members is located in the area overlapping the side parts, it proves to be expedient with respect to a deformability of the side parts under longitudinal forces in the event of a collision, for it to be bent out upwards or downwards, or even toward the center of vehicle, depending on its particular intended connection to the structural or frame side member.

A deformation property that is desired for the side parts with respect to a collision event, somewhat analogous to the deformation property desired for the structural or frame side members, must not result in an unacceptable reduction in operational strength and stiffness of the subframe, when the intention is for this subframe to still ensure an exact suspension. To achieve this, the subframe of the present invention forms an open box, whose sides are formed by the side parts, and whose cross elements joining the side parts are constituted on the top by a cross member and, on the bottom, by a flat, in particular plate-like supporting element. If, in accordance with one preferred embodiment, provision is made for only one upper cross element, thus for only one cross member, then even in response to the occurrence of buckling, or mashing, there is no need to fear locking under the influence of longitudinal forces that occur in a head-on collision, particularly when the cross member is designed as an open, hollow section.

Analogous to the side parts, the lower, plate-like cross element can have a soft type of construction with respect to the longitudinal forces in the event of a collision. At the same time, the plate-like cross element can, to the extent that is necessary, exhibit the requisite rigidity in the transverse direction as the result of it being structurally formed or braced to this effect, to permit operating forces to be transmitted among the side parts during steering and braking. The articulation of the plate-like cross element in the area of the articulated links of the lower suspension elements ensures that forces are favorably transmitted and absorbed.

Detachably securing the plate-like cross element to the side parts makes it practical for the subframe to also be used as an assembly frame, given one axle having steerable wheels, in particular a front axle. This assembly frame expediently contains the steering system and, in particular, the cylindrical housing for drag links acting on the tie rods, with the drag link housing also able to be used simultaneously to reinforce the flat cross element in the transverse direction of the vehicle. In a comparable manner, the stabilizer can also be connected to the subframe and in this way contribute to the stiffening action with respect to the transverse forces. The plate-like cover, which is effected by the lower cross element, is used at the same time to protect the units.

BRIEF DESCRIPTION OF THE DRAWINGS

An embodiment of the present invention is described below and elucidated on the basis of the drawings, in which.

DETAILED DESCRIPTION

Figure 1:
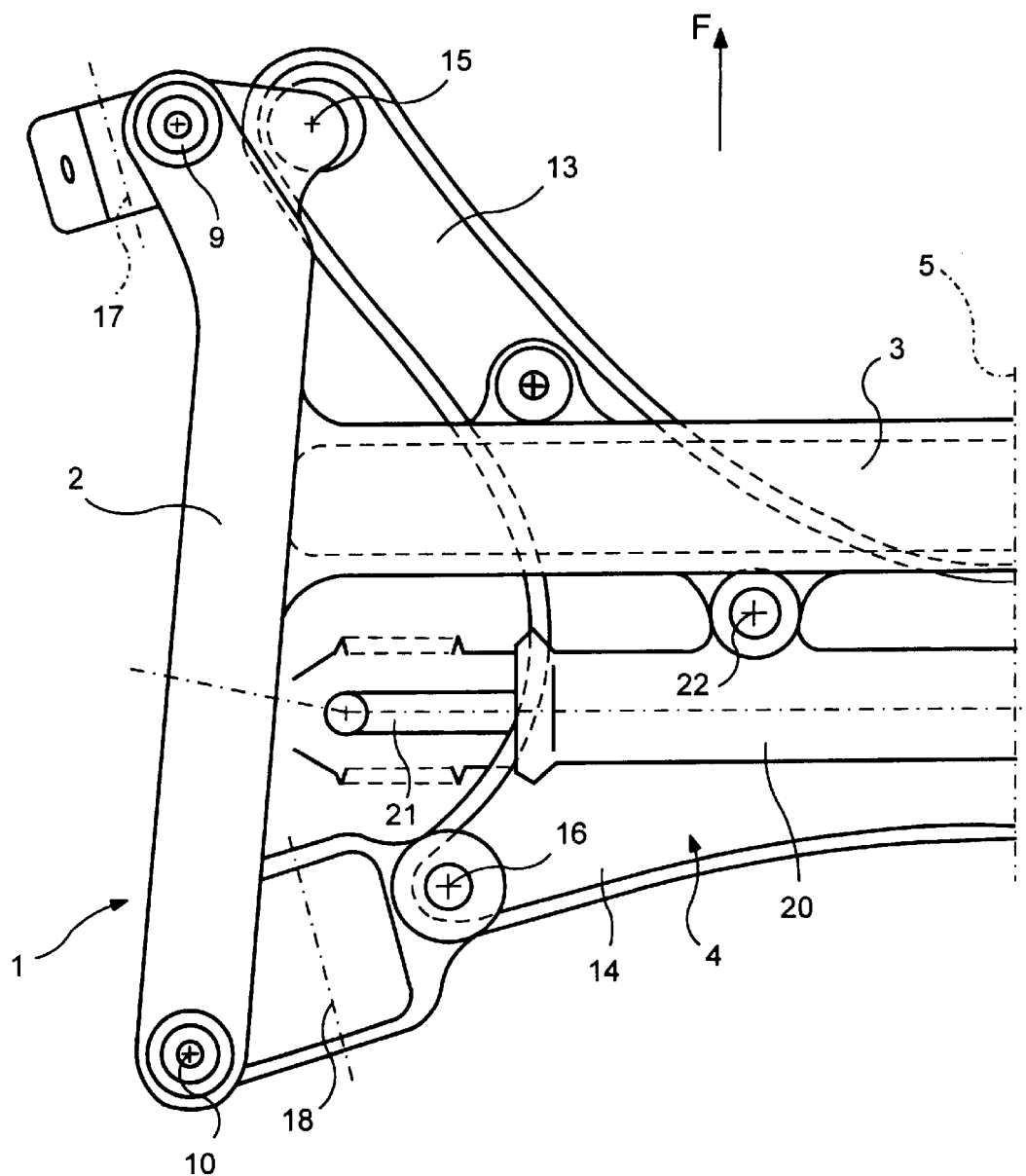
FIG. 1 is the left side of a subframe having a mirror-inverted design, in a plan view.
Figure 2:
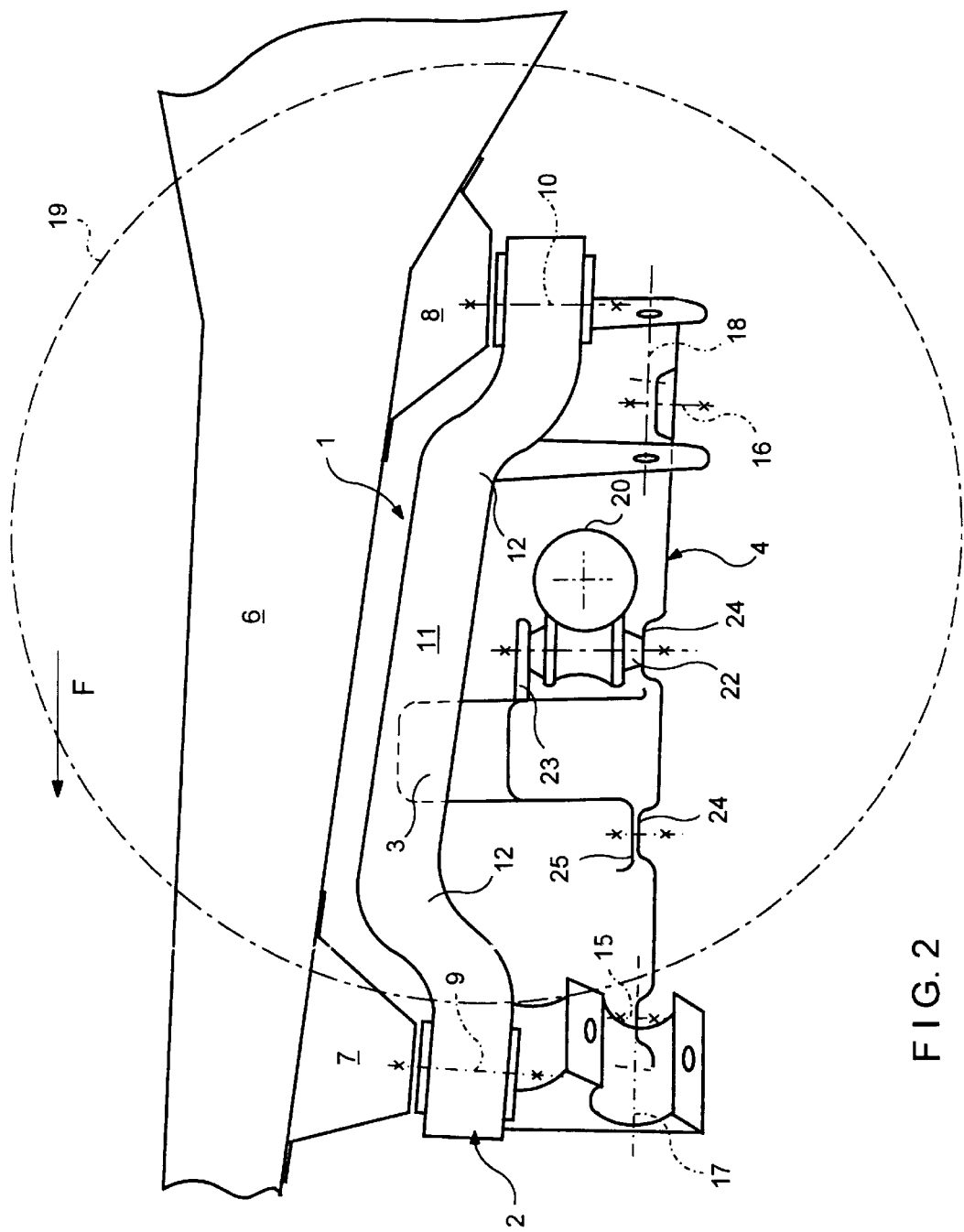
FIG. 2 is a side, partially in cross-section view of the representation according to FIG. 1, showing the connection of the subframe to the corresponding structural or frame side member of the vehicle.

The subframe for motor vehicles is denoted, as a whole, by 1, as shown in FIGS. 1 and 2, and includes side parts 2 and cross elements 3 and 4 joining these side parts, the cross elements being vertically offset from one another. Cross element 3 constitutes an upper cross member, and cross element 4 a lower, flat, in particular plate-like element. FIG. 1 shows only the left side of subframe 1 with respect to the forward driving direction F, since the essential elements of subframe 1 are symmetrical in design toward the vehicle's longitudinal middle plane 5. With respect to longitudinal middle plane 5, and thus also forward driving direction F, cross elements 3 and 4 extend orthogonally, while side parts 2 are essentially oriented in the longitudinal vehicle direction, and thus essentially parallel to longitudinal middle plane 5 of the vehicle. As FIG. 2 shows, side parts 2 are secured to side members 6, which, as side front-end members, belong to the frame or to the body structure of the vehicle (not shown further) and which, toward the rear, in the area of the vehicle's bulkhead, pass over into the vehicle sills. Side parts 2 taper off in the front end area, in terms of driving direction F, to the front of the vehicle, and support, for example, the vehicle bumper.

The side view according to FIG. 2, which is combined in part with a sectional view, shows that side parts 2 are hinged on cantilevers 7 and 8 projecting down from side members 6, so that a clearance remains between cantilevers 7 and 8, i.e., between side member 6 and the plane where side parts 2 are secured to cantilevers 7 and 8. Side parts 2, which extend in the longitudinal vehicle direction, are, for example, bolted in the area of their free ends to cantilevers 7 and 8 via schematically depicted bolted connections 9 and 10, and, in the clearance space between cantilevers 7 and 8, they are bent out upwards between bolted connections 9 and 10. With respect to longitudinal forces, as occur, for example, in the event of a head-on collision, and which produce accordion-type crumpling in side members 6 due to longitudinal mashing, side parts 2 constitute quasi reinforcements for side member 6. This effect, which is undesirable as far as a controlled buckling of side members 6 is concerned, is countered by the bent-out configuration of side parts 2 in their longitudinal middle area. The bent-out area of side parts 2 are denoted by 11 and lead, with respect to the longitudinal forces mentioned, to a weakening of side parts 2, in such a way that, in spite of the stiffening effect produced by side parts 2, a controlled deformation of cross members 6 is possible. Bent-out area 11, departing from the bent-out upward configuration shown, can also be bent out downwards or to the side, in particular to the middle of the vehicle. Because of bent-out area 11, side members 6 can buckle under stiffening of the deformation in the bent-out area and, in fact, while the entire structure of subframe 1 is retained, the weakening produced by bent-out area 11 with respect to longitudinal forces also ensures that the desired overall collision performance characteristics are still retained.

In response to side member 6 being pushed together in the area between bolted connections 9 and 10, junction regions 12 of the bent-out area 11 assume a steeper position. The degree of deformation in the middle area of bent-out area 11 is therefore relatively small, and, as a consequence, cross element 3, which is configured in the middle area in the bent-out area 11 and is constituted by a member having an open, hollow section, essentially retains its position.

This is notwithstanding that cross element 3 constituted by the member is joined to plate-like cross element 4 disposed vertically beneath it. Cross element 4, in turn, as illustrated by FIGS. 1 and 2, is, when extended flat, connected via arms 13 and 14 running toward side parts 2 to the side parts 2. This connection occurs in the end regions of side parts 2 via articulated links 15 and 16, for example via bolted connections. In this context, articulated links 15 and 16 are situated in the area of automobile-body side bearings 17 or 18 of suspension elements, which are constituted by the lower bearings (not shown further) of a suspension element. The upper suspension element or elements are braced, while being vertically offset against side parts 2, as upper suspension elements, for example. These suspension bearings likewise come into consideration, these suspension bearings being supported on a cantilever that projects upwards from side parts 2 in a manner not shown further.

Since articulated links 15 and 16 are quasi directly adjacent to bearings 17 and 18 of the lower suspension elements, the operating forces, e.g., steering and braking forces, to be absorbed in bearings 17 and 18, can be advantageously absorbed by lower cross element 4 and distributed via this cross element to mutually opposing side parts 2 which are each joined to vehicle side members 6. Properly contouring cross element 4, for example by properly shaping the edge of the same, and/or configuring ribbing transversely to the vehicle, ensures in this context that cross element 4 exhibits the requisite deformation rigidity for the dynamic transverse forces mentioned, while ensuring that it remains flexible with respect to the forces acting in the longitudinal vehicle direction, thus, for example, the forces produced by a collision. This applies both to the area of arms 13 and 14, which are able to move toward one another in response to such a buckling of side parts 2 in the longitudinal direction, as well as to the middle area of cross element 4 adjacent to the vehicle's longitudinal middle plane 4. This is since cross element 4 is substantially narrowed toward the vehicle's longitudinal middle plane 5, and arms 13 and 14 subsequently diverge at this narrowed area, so that in spite of the narrow middle area in the area of the vehicle's longitudinal middle plane, a large supporting base is able to be achieved.

In its narrowed middle area, lower cross element 4 is offset to the rear with respect to the middle between articulated links 15 and 16 in the longitudinal vehicle direction so that the rearward limitation of lower cross element 4 with respect to the longitudinal extension of the vehicle is close to the connecting line of the mutually opposing, rear articulated links 16. Meanwhile, the front limitation of lower cross element 4 in the middle longitudinal, narrowed area is more or less in a transverse plane, which, with respect to the longitudinal direction, is centrally disposed between articulated links 15 and 16. Thus, the front limitation of lower cross element 4 in the narrowed area adjacent to the vehicle's longitudinal middle plane 5 generally coincides in the plan view according to FIG. 1, with respect to the longitudinal vehicle direction, with the rear edge of upper cross element 3 constituted as a member. Upper cross element 3, as shown by FIG. 2, using the bent-out areas of side parts 2 as a baseline, is therefore curved through downwards in the direction of the vehicle's longitudinal middle plane 5.

Extending adjacent to the member forming upper cross element 3, as part of the steering system for wheels—denoted by 19 in FIG. 2—supported by side parts 2 via suspension elements is a guide 20 for drag links 21. Drag links 21 act on wheels 19 by way of tie rods that join up with drag links, and by way of other connecting parts. Drag links 21 are adjustable in the transverse driving direction via a steering system connected to guide 20. As guide 20 is, for example, a cylindrical drag link housing. This drag link housing, as is apparent in particular from FIG. 2, is braced both against upper cross element 3, as well as against lower, plate-like cross element 4. This bracing element is schematically denoted in FIG. 2 by 22 and is preferably an elastic supporting element which is bolted to a cantilever 23 of the supporting member, i.e. upper cross element 3, and to plate-like cross element 4.

In this manner, at least parts of the steering system, in this case the mounting support for drag link guide 20, and the steering gear form a connection between the top and bottom cross element. This connection produces a reinforcement of lower cross element 4 in the transverse vehicle direction, so that, with respect to the transverse forces, cross element 4 obtains the necessary stiffness even when working with a relatively thin-walled design. Also contributing to this is the fact that the lower cross element, as indicated illustratively in the area of the supporting element, as a sheet metal part, undergoes a substantial stiffening through ribbing or lock-beading with a pattern running transversely to the driving direction. Such ribs or beads are denoted by 24, and provision is also made for a ribbing or lock-beading 24 of this kind in the area of cross element 4 disposed in front of cross element 3 relative to driving direction F, where cross element 3 is joined via an angled limb area 25 to cross element 4.

If, as already mentioned above, side member 6 buckles or mashes in response to a collision, the result is that the side parts become shorter in junction region 12 because the bending angle is enlarged, but they essentially retain their position with respect to the bent-out area 11, the result being that the suspension, inclusive of the steering system, is functionally retained. In this context, the vertical offset of upper and lower cross element 3 or 4 prevents these parts from being able to hit one another, even in the case of a displacement in the driving direction. On the other hand, the subframe has an essentially box-shaped cross-section, which lends it considerable stability while providing for a light-weight design. This is enhanced by the fact that upper and lower cross-element 3 or 4 are supported reciprocally over parts of the steering system. The integration of these parts in subframe 1, in conjunction with the articulated linking of suspension elements on subframe 1, offers the advantage of using subframe 1 as an assembly, or mounting, unit, enabling the wheel suspension and steering system to be installed as preassembled systems via side parts 2 on side members 6 of the vehicle body. Such a use of the subframe as an assembly unit is also beneficial in view of the positioning of all articulation points of the suspension independently of vehicle body tolerances. In one embodiment of the present invention, the stabilizer that is customarily used also preferably extends, in the driving direction, from before upper cross element 3 and adjacent to this element (in a manner not shown here), with the stabilizer, in its movement area, adjacent to the lateral stabilizer arms, being rotationally mounted on side parts 2. In this arrangement, the stabilizer also acts as a transverse stiffening element for the subframe, facilitating a comparatively weak dimensional design for member 3. The stabilizer, cross element 3 and drag link guide 20 form a very compact unit, which, because of the profiling of cross element 3, is nevertheless designed to be compressed in the longitudinal vehicle direction in the event of a head-on collision, but, in the process, also results in a favorable force distribution over the width of the vehicle.

The flat, in particular plate-like, lower cross element 4 according to the present invention also provides a shielding effect for the units supported by the subframe, especially in the sense of impact protection.

What is claimed is:

1. A subframe for a motor vehicle having a longitudinal middle plane and upper and lower suspension elements having assigned upper and lower bearings, the subframe comprising:

side parts detachably secured to a body or frame of the vehicle, the side parts being provided with downwardly-projecting cantilevers for supporting the lower bearings, each side part having end sections having a curved profile and a middle piece between the end sections so as to form a bent-out area over a deformation zone, the side parts capable of being shortened under an influence of longitudinal forces;

an upper cross member, the upper cross member joined to the side parts in an area of the middle pieces; and a lower cross reinforcement member being disposed at the level of the lower bearings between the cantilevers to join the cantilevers, the lower cross reinforcement member having a plate-like, flat configuration and having a middle area and arms extending from the middle area, the middle area narrowing toward the longitudinal middle plane and the arms diverging from the middle area towards the end sections of the side parts.

2. The subframe as recited in claim 1 wherein the subframe is for a front axle of a passenger car.

3. The subframe as recited in claim 1 wherein the arms are adjacent to the lower bearings and are secured to the cantilevers.

4. The subframe as recited in claim 1 further comprising articulated links for connecting the arms to the cantilevers at a side of the cantilevers facing away from the suspension elements.

5. The subframe as recited in claim 1 wherein the side parts and the upper cross member form a single integrated unit.

6. The subframe as recited in claim 5 wherein the lower cross reinforcement member is detachably joined to the unit.

7. The subframe as recited in claim 1 wherein the vehicle has an upward, a downward and a side direction, and wherein the bent-out areas are directed upwardly, downwards, or to the side.

8. The subframe as recited in claim 1 wherein the upper cross member is formed as a rail having a U-shaped cross-section.

9. The subframe as recited in claim 8 wherein the U-shaped cross section has limbs which extend toward the lower cross reinforcement member.

10. The subframe as recited in claim 1 wherein the vehicle has a longitudinal vehicle direction, and wherein the narrowed middle area of the lower cross reinforcement member includes a transversely running, rear limitation and wherein the arms include arms disposed to a rear with respect to the longitudinal vehicle direction, the rear disposed arms essentially being an extension of the transversely running, rear limitation.

11. The subframe as recited in claim 10, wherein the arms include arms disposed to a front with respect to the longitudinal vehicle direction, the front disposed arms extending obliquely to the front and outwardly relative to the middle area.

12. The subframe as recited in claim 11 wherein the arms include front disposed arms, and wherein the upper cross member is disposed in a plan view essentially between a front side of the middle area and a point where the front disposed arms are attached to the side parts.

13. The subframe as recited in claim 1 wherein the lower cross reinforcement member is a mounting platform for a steering system for steering wheels of the motor vehicle.

14. The subframe as recited in claim 13 further comprising the steering system and wherein the steering system includes a guide for drag links that are displaceable in a transverse direction of the vehicle, the guide including a housing, and wherein the housing is disposed, in plan view, between the upper cross member and the lower cross reinforcement member, the housing being joined to the upper cross member and the lower cross reinforcement member.

15. The subframe as recited in claim 14 wherein the upper cross member and the lower cross reinforcement member are braced against one another by their attachment to the guide.

16. The subframe as recited in claim 1 wherein the vehicle has a transverse direction and wherein the lower cross reinforcement member is configured as a profiled body having ribbing running in the transverse direction.

\* \* \* \* \*